United States Patent
Weaver et al.

(10) Patent No.: US 11,105,209 B2
(45) Date of Patent: Aug. 31, 2021

(54) TURBINE BLADE TIP SHROUD

(71) Applicant: General Electric Company, Schenectady, NY (US)

(72) Inventors: Matthew Mark Weaver, Loveland, OH (US); Dane Michael Dale, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 190 days.

(21) Appl. No.: 16/114,741

(22) Filed: Aug. 28, 2018

(65) Prior Publication Data

US 2020/0072061 A1  Mar. 5, 2020

(51) Int. Cl.
  *F01D 5/20* (2006.01)
  *F01D 5/22* (2006.01)
  *F01D 11/00* (2006.01)

(52) U.S. Cl.
  CPC .......... *F01D 5/225* (2013.01); *F01D 5/20* (2013.01); *F01D 11/006* (2013.01); *F05D 2220/30* (2013.01); *F05D 2240/11* (2013.01); *F05D 2240/24* (2013.01); *F05D 2240/307* (2013.01)

(58) Field of Classification Search
  CPC .......... F01D 5/225; F01D 5/20; F01D 11/006; F05D 2220/30; F05D 2240/11; F05D 2240/24; F05D 2240/125; F05D 2240/307; F05D 2260/38; F05D 2300/6033
  See application file for complete search history.

(56) References Cited

U.S. PATENT DOCUMENTS

| | | | | |
|---|---|---|---|---|
| 1,378,464 A | * | 5/1921 | Junggren | F01D 5/225 416/190 |
| 2,198,784 A | * | 4/1940 | Mikina | F01D 5/22 416/196 R |
| 3,981,609 A | | 9/1976 | Koenig | |

(Continued)

FOREIGN PATENT DOCUMENTS

WO   WO-2015177473 A1 * 11/2015  ............. C08J 5/043

OTHER PUBLICATIONS

"ASTM A227 Spring Steel", www.makeitfrom.com/material-properties/ASTM-A227-Spring-Steel, retrieved Aug. 24, 2017. (Year: 2017).*

(Continued)

*Primary Examiner* — Igor Kershteyn
*Assistant Examiner* — Joshua R Beebe
(74) *Attorney, Agent, or Firm* — Dority & Manning, P.A.

(57) ABSTRACT

A shroud assembly for a gas turbine engine including a plurality of rotor blades. The shroud assembly includes a plurality of tip shrouds, a plurality of flanges, and a plurality of first compressible elements. Each of the plurality of tip shrouds includes an outer band. Further each of the plurality of tip shrouds is coupled to one of the plurality of rotor blades at a tip end. Each of the plurality of flanges extends radially outward from one of the plurality of tip shrouds. Each of the plurality of first compressible elements is coupled to at least one of the plurality of flanges or one of the plurality of tip shrouds and oriented in a first circumferential direction. Further, each of the plurality of first compressible elements is oriented toward an adjacent tip shroud such that the tip shrouds mechanically engage to form a circumferential shroud.

20 Claims, 9 Drawing Sheets

(56) References Cited

U.S. PATENT DOCUMENTS

| | | | |
|---|---|---|---|
| 4,013,376 A | 3/1977 | Bisson et al. | |
| 4,784,571 A * | 11/1988 | Ferleger | F01D 5/22 |
| | | | 416/191 |
| 4,868,963 A | 9/1989 | Corsmeier et al. | |
| 5,762,472 A | 6/1998 | Pizzi et al. | |
| 6,506,022 B2 | 1/2003 | Bunker | |
| 7,217,089 B2 | 5/2007 | Durocher et al. | |
| 7,771,171 B2 | 8/2010 | Mohr et al. | |
| 7,806,410 B2 * | 10/2010 | El-Aini | F01D 11/02 |
| | | | 277/413 |
| 8,979,486 B2 | 3/2015 | Rioux | |
| 9,163,519 B2 | 10/2015 | Kleinow et al. | |
| 9,188,014 B2 * | 11/2015 | Fachat | F01D 5/225 |
| 9,739,156 B2 | 8/2017 | Boeck et al. | |
| 9,777,594 B2 * | 10/2017 | Lang | F01D 25/246 |
| 9,903,210 B2 | 2/2018 | Evans et al. | |
| 2008/0197575 A1 * | 8/2008 | El-Aini | F01D 11/02 |
| | | | 277/303 |
| 2009/0097979 A1 | 4/2009 | Erdmann et al. | |
| 2013/0052032 A1 * | 2/2013 | Fachat | F01D 5/282 |
| | | | 416/241 R |
| 2013/0251939 A1 | 9/2013 | Kleinow | |
| 2014/0205463 A1 * | 7/2014 | Herraiz | F01D 5/225 |
| | | | 416/230 |
| 2016/0305278 A1 * | 10/2016 | Lang | F01D 5/22 |
| 2017/0198591 A1 * | 7/2017 | Roussille | C04B 35/806 |

OTHER PUBLICATIONS

"Hi-Nicalon(tm) Ceramic Fiber", www.coiceramics.com/pdfs/hi-nicalon-types_1-17-06.pdf, retrieved Mar. 10, 2016 (Year: 2016).*

Arkadeep ?Narayan Chaudhury, Debasis Datta, "Analysis of prismatic springs of non-circular coil shape and non-prismatic springs of circular coil shape by analytical and finite element methods", Feb. 8, 2017, Journal of Computational Deisgn and Engineering 4(2017), pp. 178-191 (Year: 2017).*

* cited by examiner

TURBINE BLADE TIP SHROUD

FIELD

The present subject matter relates generally to turbine blades of turbomachines. More particularly, the present subject matter relates to a shroud assembly for gas turbine blades.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Typically, the turbine section includes one or more stator vane and rotor blade stages, and each stator vane and rotor blade stage comprises a plurality of airfoils, e.g., nozzle airfoils in the stator vane portion and blade airfoils in the rotor blade portion.

Typical turbine sections include a shroud positioned radially outward of the rotor blades to define a flowpath for the combustion gas. Some turbine sections define a small radial gap between the rotor blades and the shroud such that the rotor blades may rotate in relation to the shroud. Other turbine sections couple or attach the rotor blades to tip shroud segments such that the rotor blades and the shroud rotate together. Such tip shrouds are generally locked together to provide stability and acceptable aeromechanics to the rotor blades. In such turbine sections, the airfoils of the rotor blades generally are pre-twisted to preload the rotor blades to ensure the tip shroud segments remain locked.

In general, turbine performance and efficiency may be improved by increased combustion gas temperatures. More commonly, non-traditional high temperature materials, such as ceramic matrix composite (CMC) materials, are being used in gas turbine applications. Components fabricated from such materials have a higher temperature capability compared with typical components, e.g., metal components, which may allow elimination of cooling features and/or increased engine temperatures. Accordingly, using high temperature materials for at least a portion of the airfoils in, e.g., the turbine section of a gas turbine engine may improve the durability of the airfoils, as well as improve time on wing and increase engine performance. For example, utilizing airfoils having a CMC segment may allow performance and durability improvements without greatly impacting manufacturing costs.

Though many benefits may be realized by utilizing CMC components, CMC materials may have drawbacks. For example, rotor blades formed from CMC materials may be stiffer than similar rotor blades formed from nickel alloys. The increased stiffness of CMC rotor blades may create difficulties adequately pre-twisting the rotor blade without overstressing the component.

Therefore, a shroud assembly that mechanically engages tip shrouds together while reducing stress on the rotor blades would be welcome in the art.

BRIEF DESCRIPTION

Aspects and advantages will be set forth in part in the following description, or may be obvious from the description, or may be learned through practice of the invention. In view of the above, the present invention provides a shroud assembly including compressible elements between shroud tips to form circumferential shroud.

In one aspect, the present disclosure is directed toward a turbine blade assembly for a gas turbine engine. The gas turbine engine includes a rotating shaft drivingly coupling a compressor and a turbine. The turbine blade assembly includes an airfoil, a tip shroud, a flange, and a first compressible element. The airfoil has a body extending radially from a root end coupled to the rotating shaft to a tip end. The airfoil may further include a pressure side and a suction side extending between a leading edge and a trailing edge. The airfoil may extend into a flowpath for hot combustion gas. As such, the airfoil may convert the kinetic and/or thermal energy of the hot combustion gas into rotational energy to drive one or more components of the gas turbine engine, e.g., one or more compressors via the rotating shaft.

The tip shroud includes an outer band coupled to the tip end of the turbine blade. For example, the tip shroud may define an outer most boundary of a flowpath for the hot combustion gas. In certain embodiments, the outer band may define the outer most boundary of the flowpath. In other embodiments, the tip shroud may further include an inner band to define the outer most boundary of the flowpath. The outer band may include one or more contact faces oriented in a circumferential direction. Further, such contact faces may be operable with contact faces of adjacent turbine blade assemblies in the circumferential direction. In certain embodiments, the outer band may be a cast interface coupled to the rest of the tip shroud.

The flange extends radially outward from the tip shroud. For example, the flange may be coupled to the tip shroud, such as the outer band. In certain embodiments, the flange may be coupled to the airfoil and extend radially through the tip shroud to extend radially outward from the outer band. In other embodiments, the flange may include part of the airfoil that extends through and past the outer band in the radial direction. In other embodiments, the flange may include a contact build-up on the outer band. Still further, the flange may be machined on to the outer band. For example, the material surrounding the flange may be removed, leaving the flange. In another embodiment, the turbine blade assembly may include a plurality of flanges extending from the outer band.

The turbine blade assembly includes a first compressible element coupled to at least one of the flange or the tip shroud and oriented in a first circumferential direction. For example, the first compressible element may be oriented toward an adjacent turbine blade assembly in the circumferential direction. It should be recognized that the first circumferential direction may be the direction of rotation of the turbine blade assembly. For example, the first circumferential direction may be the direction the rotating shaft rotates. In other embodiments, the first circumferential direction may be the opposite direction the turbine blade assembly rotates. It should be recognized that the first compressible element may be coupled to a plurality of flanges on the outer band. Further, the first compressible element may be coupled to two or more flanges and the outer band directly. The first compressible element may be coupled to the flange and/or tip shroud using any suitable means, such as by adhesives, tape, welding, and/or mechanical fasteners (e.g., bolts, screws, and rivets). For example, the first compressible element may be coupled to the flange using a tack welded pin.

The first compressible element is mechanically operable with an adjacent turbine blade assembly to provide a force in the first circumferential direction or a second circumferential direction opposite the first circumferential direction. For example, the first compressible element may be in compression with a component of an adjacent turbine blade. By compressing the first compressible element, the first compressible element may supply a contra force opposite the adjacent turbine assembly, i.e., in the second circumferential direction. In another embodiment, the first compressible element may be in tension with the component of the adjacent turbine blade assembly. In such embodiments, the first compressible element may supply a force in the same direction as the adjacent turbine blade assembly, i.e., in the first circumferential direction.

In one embodiment, at least two of the airfoil, the tip shroud, or the flange may be formed as a unibody. For example, the airfoil and the tip shroud may be formed as single integral piece. In other embodiments, all three of the airfoil, the tip shroud, and the flange may be formed as a single unibody. In further embodiments, the unibody may include a ceramic matrix composite.

In another embodiment, the turbine blade assembly may include a first seal tooth extending radially outward from the outer band of the tip shroud. For example, the seal first tooth may extend along the full length of the outer band and also extend radially out from the outer band. The seal tooth may be in sealing engagement with an outer casing of the gas turbine engine. For example, the outer casing may define one or more slots to receive the first seal tooth. The first seal tooth may prevent the hot combustion gas from leaking past the tip shroud and flowing axially down any gap or cavities between the tip shroud and the outer casing. In such embodiments, at least two of the airfoil, the tip shroud, the flange, or the first seal tooth may be formed as the unibody, such as a unibody including a ceramic matrix composite. In still further embodiments, the turbine blade assembly may include a second seal tooth extending radially outward from the outer band of the tip shroud. The second seal tooth may be positioned aft of the first seal tooth in the axial direction.

In another embodiment, the turbine blade assembly may include a second compressible element coupled to at least one of the flange or the tip shroud and oriented in the second circumferential direction. The second compressible element may be mechanically operable with another adjacent turbine blade assembly to provide a force in the first circumferential direction or the second circumferential direction. For example, the second compressible element may be in compression between the rotor blade assembly and a component of the adjacent rotor blade assembly in the second circumferential direction. By compressing the second compressible element, the second compressible element may supply a contra force opposite the adjacent turbine assembly, i.e., in the first circumferential direction. It should be further understood that the turbine blade assembly may further include any of the additional features as described herein.

In another aspect, the present invention is directed to a shroud assembly for a gas turbine engine including a plurality of rotor blades. The shroud assembly includes a plurality of tip shrouds, a plurality of flanges, and a plurality of first compressible elements. Each of the plurality of tip shrouds includes an outer band. Further each of the plurality of tip shrouds is coupled to one of the plurality of rotor blades at a tip end. Each of the plurality of flanges extends radially outward from one of the plurality of tip shrouds. Each of the plurality of first compressible elements is coupled to at least one of the plurality of flanges or one of the plurality of tip shrouds and oriented in a first circumferential direction. Further, each of the plurality of first compressible elements is oriented toward an adjacent tip shroud such that the tip shrouds mechanically engage to form a circumferential shroud. For example, a compressive force supplied by each of the first plurality of compressible elements may keep each of the plurality of tip shrouds engaged with their respective adjacent tip shrouds in the first circumferential direction. It should be recognized that friction between each first compressible element and its respective adjacent tip shroud may reduce displacements of the tip shrouds and/or rotor blades in the circumferential and/or the axial directions.

The plurality of tip shrouds and plurality of first compressible elements may be arranged in series to define a circular profile and form the circumferential shroud. It should be recognized that the assembled circumferential shroud may define the outer boundary of the flowpath for hot combustion gas at its respective turbine stage.

It should be recognized that the circumference of the circumferential shroud may be variable based on the operating condition of the gas turbine engine. For example, at low RPMs such as at idle or when the gas turbine engine is off, the circumferential shroud may define a relatively smaller circumference. When the gas turbine engine is operating at higher RPMs, such as at a take-off condition or cruise condition, inertia of the rotating rotor blades may expand the rotor blades in the radial direction. Such expansion may displace the tip shrouds outward in the radial direction and cause the circumferential shroud to define a relatively larger circumference. It should also be recognized that the hot combustion gas flowing past the rotor blades may also cause thermal expansion of the rotor blades and/or the tip shrouds. Such thermal expansion may also increase the circumference of the circumferential shroud. It should be recognized that the first compressible element may be compressed more when the circumferential shroud has a smaller circumference, thereby supplying a greater force to keep the plurality of tip shrouds engaged with their respective adjacent tip shrouds in the first circumferential direction. Further, the first compressible elements may be compressed less when the circumferential shroud has a larger circumference, thereby supplying a smaller force to keep the plurality of tip shrouds engaged with their respective adjacent tip shrouds in the first circumferential direction.

In one embodiment, each of the plurality of first compressible elements may be coupled to at least one of an adjacent flange or tip shroud in the first circumferential direction such that the each of the first compressible elements couples two of the plurality of tip shrouds together. In such an embodiment, the plurality of first compressible elements may couple the plurality of tip shrouds together such that the entire circumferential shroud is formed substantially as a complete ring, each tip shroud segment coupled in series to the next tip shroud in the first circumferential direction. Further, it should be recognized that in such embodiments the first compressible elements may be in tension when the circumferential shroud defines a larger circumference, such as a maximum circumference. In such embodiments, the force applied by each of the first compressible elements oriented in the first circumferential direction may also be in the first circumferential direction. Further, in other embodiments, the first compressible elements may be in tension throughout various operating conditions of the gas turbine engine, such as when the circumferential shroud defines a smaller circumference.

In another embodiment, the shroud assembly may further include a plurality of second compressible elements coupled to at least one of the plurality of flanges or one of the plurality of tip shrouds and oriented in a second circumferential direction opposite the first circumferential direction. For example, each of the plurality of first compressible element may be in mechanical engagement with one of the plurality of second compressible elements of an adjacent rotor blade in the first circumferential direction to form the circumferential shroud. In such embodiments, a compressive force of the first compressible element and/or the second compressible element may keep the each of the plurality of tip shrouds engaged with their respective adjacent tip shrouds in both the first and second circumferential directions. It should be recognized that friction between each first compressible element and the adjacent second compressible element may reduce displacements of the tip shrouds and/or rotor blades in the circumferential and/or the axial directions. The plurality of tip shrouds, plurality of first compressible elements, and the plurality of second compressible elements may be arranged in series to define the circular profile and form the circumferential shroud.

In a further embodiment, each of the plurality of first compressible elements may be coupled to one of the plurality of second compressible elements. In such an embodiment, the plurality of first compressible elements and plurality of second compressible elements may couple the plurality of tip shrouds together such that the entire circumferential shroud is formed substantially as a complete ring, each tip shroud segment coupled in series to the next tip shroud in the first circumferential direction via both the first compressible element and the second compressible element. Further, it should be recognized that in such embodiments the first compressible element and second compressible element may be in tension.

In another embodiment, each of the plurality of tip shrouds forms a unibody with one of the plurality of flanges. In a further embodiment, each unibody further includes one of the plurality of rotor blades. Further, the unibody may include a ceramic matrix composite.

In one embodiment, each of the plurality of first compressible elements includes a first Young's modulus, and the each of the plurality of tip shrouds includes a second Young's modulus. In such embodiment, the first Young's modulus may be less than the second Young's modulus. As such, the each of the plurality of first compressible elements may be more elastic than each of the plurality of tip shrouds. Further, the first Young's modulus may be less than a third Young's modulus of the plurality of rotor blades such that the plurality of first compressible elements is more elastic than the plurality of rotor blades.

In one embodiment, at least one of the plurality of first compressible elements includes a spring. For example, the spring may include a first segment coupled to the flange and/or the tip shroud and a second segment oriented generally in the first circumferential direction toward the adjacent tip shroud. In a further embodiment, the spring may include a second segment extending from the first segment. For example, the spring may generally define an "F" profile. Such second segment may be oriented toward the adjacent tip shroud to mechanically engage the tip shrouds. In a further embodiment, the second segment may extend and couple to another part of the shroud assembly to further secure the spring. For example, the second segment may be coupled to at least one of the outer band or a seal tooth. In another embodiment, the spring may define a "C" profile with a bottom portion and a top portion. In certain configurations, the bottom portion may be coupled to one of the tip shroud or the flange. The top portion may be oriented toward the adjacent tip shroud to mechanically engage the tip shrouds. In certain embodiments, the top portion may extend back toward the tip shroud (e.g., in the second circumferential direction) to couple to at least one of the outer band or the seal tooth to further secure the spring to the tip shroud.

In a further embodiment, at least one of the plurality of first compressible elements includes a leaf spring. For example, the leaf spring may be coupled to one of the plurality of tip shrouds and/or one of the plurality of flanges. The leaf spring may also be coupled to the adjacent tip shroud and/or flange in first circumferential direction. It should be recognized that the leaf spring may be coupled to one of the tip shroud and/or flange or the adjacent tip shroud and/or flange at multiple locations, such as two locations.

In a still further embodiment, at least one of the plurality of first compressible elements includes a prismatic spring. For example, in such embodiments, the tip shroud, such as the outer band, may define one or more slashfaces configured to receive the prismatic spring. As such the prismatic spring and the slashface may define a male-female interface to secure the prismatic spring. In certain embodiments, the prismatic spring may be coupled to at least one of the plurality of tip shrouds, such as at the outer band. Still, in other embodiments, the prismatic spring may be oriented between adjacent tip shrouds and coupled to both of the adjacent tip shrouds. In one embodiment, the prismatic spring may be secured between adjacent tip shrouds via the compressive force and/or friction between the prismatic spring and the adjacent tip shrouds. In such embodiments, the prismatic spring may include a spring platform extending circumferentially and/or radially below the outer band to secure the prismatic spring from radially outward displacements.

In a still further embodiment, the shroud assembly may include a plurality of seal teeth, each of the plurality of seal teeth extending radially outward from one of the plurality of tip shrouds at the outer band. In such embodiments, each of the plurality of tip shrouds may form a unibody with one of the plurality of seal teeth. Further, such unibody may include a ceramic matrix composite. It should be further understood that the shroud assembly may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
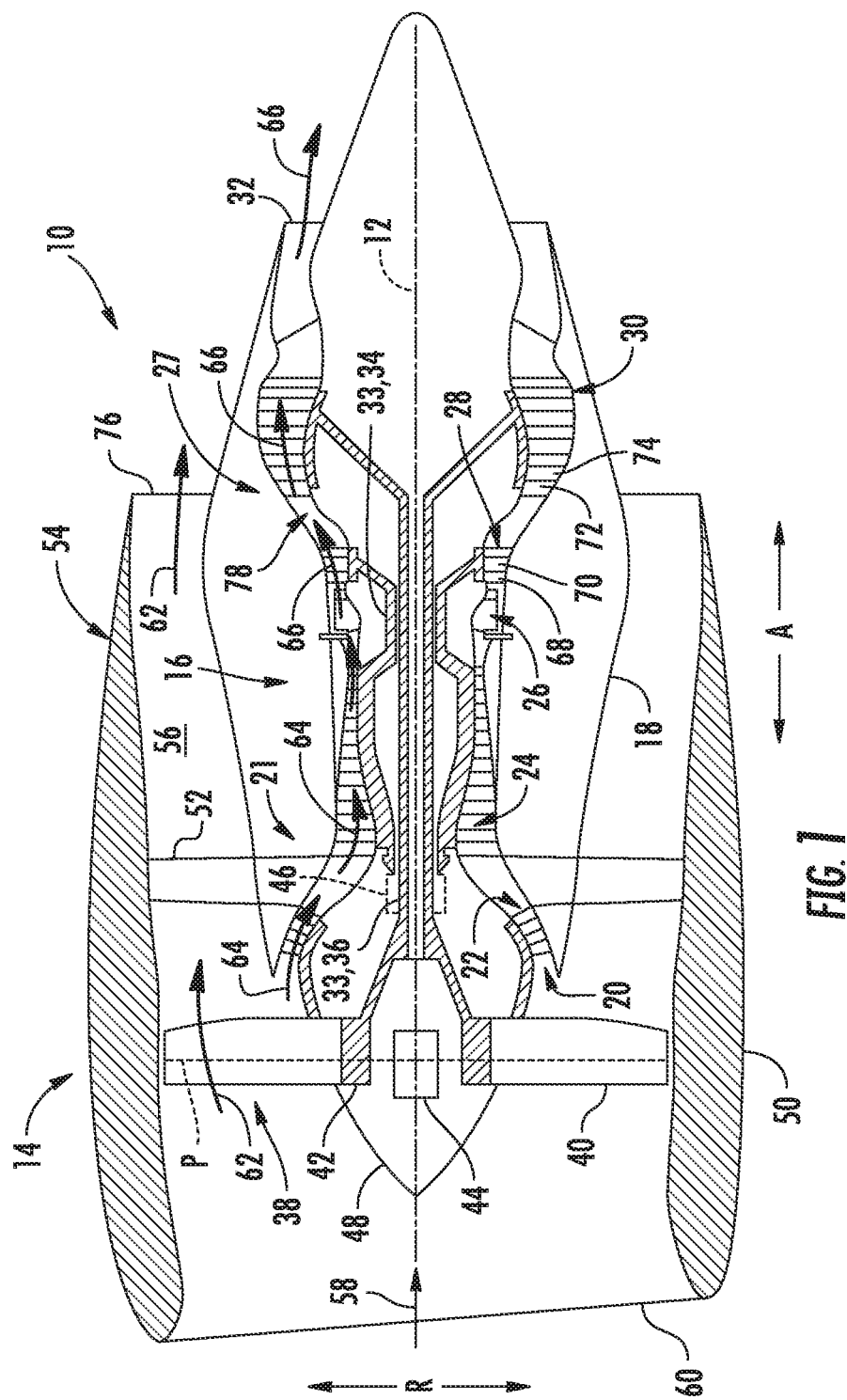
FIG. 1 illustrates a schematic cross-sectional view of a gas turbine engine in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components, unless indicated otherwise.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A shroud assembly including a compressible element between shroud tips may provide a more robust shroud assembly. For example, a shroud assembly with compressible elements may be used to mechanically engage shroud tip segments together without pre-twisting or bending the rotor blades or reducing the amount of pre-twist/bend on the rotor blades. Further, by reducing the required amount of pre-twist/bending on the rotor blades, the stress applied to such rotor blades may also be reduced. Reduced stress on the rotor blades may reduce the risk of damage to rotor blades made of certain rigid materials, such as ceramic matrix composites. Such a shroud assembly may therefore prevent damage to rotor blades, increase the life of the rotor blades, decrease engine downtime for examination of the rotor blades, and/or decrease the frequency of required inspections of the rotor blades.

It should be appreciated that, although the present subject matter will generally be described herein with reference to a gas turbine engine, the disclosed systems and methods may generally be used on components within any suitable type of turbine engine, including aircraft-based turbine engines, land-based turbine engines, and/or steam turbine engines. Further, though the present subject matter is generally described in reference to stators and rotors in a turbine section, the disclosed systems and methods may generally be used on any rotatable component where it may be desirable to fix the tips and/or end points together.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is configured as a high-bypass turbofan jet engine. Though, in other embodiments, the gas turbine engine 10 may be configured as a low-bypass turbofan engine, a turbojet engine, a turboprop engine, a turboshaft engine, or other turbomachines known in the art. As shown in FIG. 1, the gas turbine engine 10 defines an axial direction A (extending parallel to a longitudinal centerline 12 provided for reference) and a radial direction R. In general, the gas turbine engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section 21 including a booster or low pressure (LP) compressor 22 and a high pressure (HP) compressor 24; a combustion section 26; a turbine section 27 including a high pressure (HP) turbine 28 and a low pressure (LP) turbine 30; and a jet exhaust nozzle section 32. The gas turbine engine 10 includes at least one rotating shaft 33 drivingly coupled between the compressor section 21 and the turbine section 27. For example, a high pressure (HP) shaft or spool 34 may drivingly connect the HP turbine 28 to the HP compressor 24. Similarly, a low pressure (LP) shaft or spool 36 may drivingly connect the LP turbine 30 to the LP compressor 22.

For the depicted embodiment, fan section 14 includes a variable pitch fan 38 having a plurality of fan blades 40 coupled to a disk 42 in a spaced apart manner. As depicted, fan blades 40 extend outward from the disk 42 generally along the radial direction R. Each fan blade 40 is rotatable relative to the disk 42 about a pitch axis P by virtue of the fan blades 40 being operatively coupled to a suitable actuation member 44 configured to vary the pitch of the fan blades 40. Fan blades 40, disk 42, and actuation member 44 are together rotatable about the longitudinal centerline 12 by the LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the variable pitch fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the gas turbine engine 10, a volume of air 58 enters the gas turbine engine 10 through an associated inlet 60 of the nacelle 50 and/or fan section 14. As the volume of air 58 passes across the fan blades 40, a first portion of the volume of air 58 as indicated by arrows 62 is directed or routed into the bypass airflow passage 56 and a second portion of the volume of air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. At least one of the combustion section 26, HP turbine 28, the LP turbine 30, or the jet exhaust nozzle section 32 at least partially define a flowpath 78 for routing the combustion gases 66 through the core turbine engine 16. Various components may be positioned in the flowpath 78 such as the HP turbine stator vanes 68, HP turbine rotor blades 70, the LP turbine stator vanes 72, and/or the LP turbine rotor blades 74.

Figure 2:
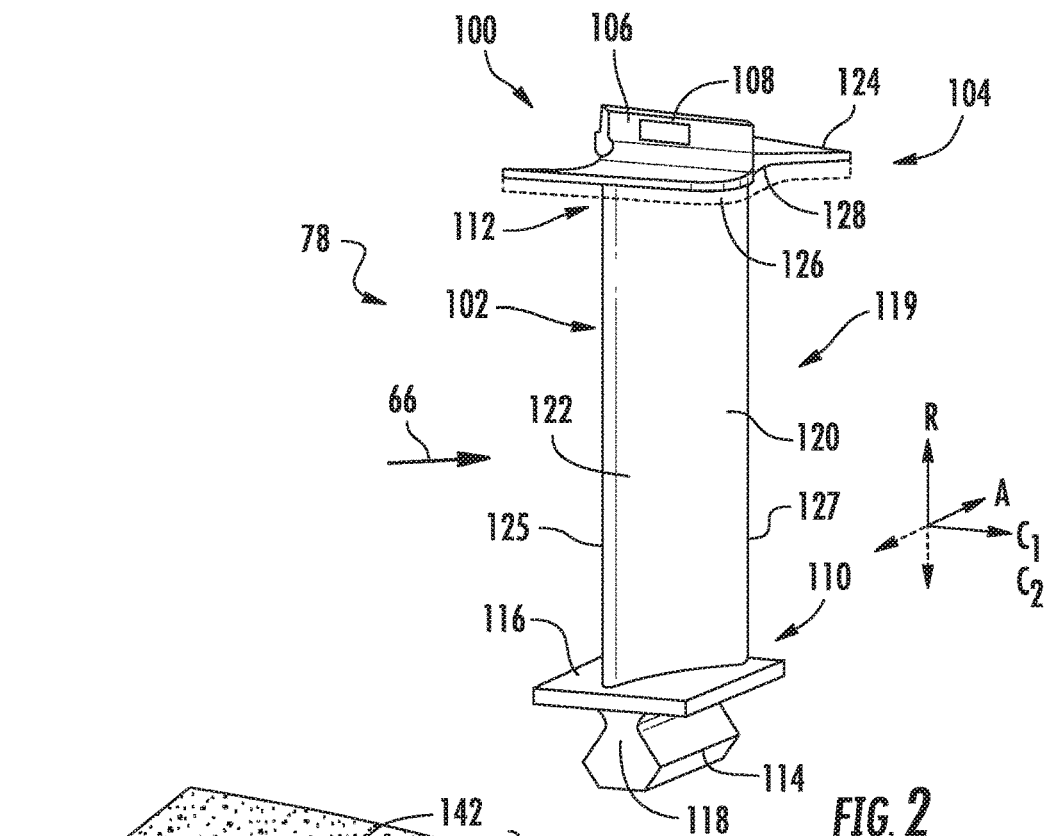
FIG. 2 illustrates a pictorial view of one embodiment of a turbine blade assembly according to aspects of the present disclosure.

Referring now to FIG. 2, a pictorial view of one embodiment of a turbine blade assembly 100 is illustrated according to aspects of the present disclosure. In certain embodiments, the turbine blade assembly 100 may include the HP turbine rotor blade 70 or the LP turbine rotor blade 74. Though, in other embodiments, turbine blade assembly 100 may include any other rotor blade of the gas turbine engine 10, such as rotor blades of an intermediate turbine.

The turbine blade assembly 100 may include an airfoil 102, a tip shroud 104, a flange 106, and a first compressible element 108. The airfoil 102 has a body extending radially from a root end 110 coupled to the rotating shaft 33 to a tip end 112. For example, the turbine blade assembly 100 may include a dovetail 114 at the root end 110 for anchoring the airfoil 102 to a turbine disk by interlocking with a complementary dovetail slot formed in the circumference of the disk. As represented in FIG. 1, the interlocking features comprise protrusions referred to as tangs that engage recesses defined by the dovetail slot, though other interlocking features may be used. The turbine blade assembly 100 is further shown as having a platform 116 that separates an airfoil 102 from a shank 118 on which the dovetail 114 is defined. It should be recognized that the dovetail 114 may be received by the disk attached to the HP shaft 34, the LP shaft 36, or any other rotating shaft 33 of the gas turbine engine 10. In certain embodiments, the airfoil 102, platform 116, and/or the dovetail 114 may define a rotor blade 119.

The airfoil 102 may further include a pressure side 120 and a suction side 122 extending between a leading edge 125 and a trailing edge 127. The airfoil 102 may extend into the flowpath 78 for the hot combustion gases 66. As such, the airfoil 102 may convert the kinetic and/or thermal energy of the hot combustion gases 66 into rotational energy to drive one or more components of the gas turbine engine 10, e.g., one or more compressors 22, 24 via the rotating shaft(s) 33.

The tip shroud 104 may include an outer band 124 coupled to the tip end 112 of the rotor blade 119, such as the airfoil 102. In certain embodiments, the tip shroud 104 may define an outer most boundary of the flowpath 78 for the hot combustion gas 66. For instance, the outer band 124 may define the outer most boundary of the flowpath 78. In other embodiments, the tip shroud 104 may further include an inner band 126 (shown in phantom) to define the inner most boundary of the flowpath 78. For instance, in certain embodiments of the tip shroud 104, the inner band 126 may include a thermal coating and/or a aerodynamically profiled band configured to promote the flow of the hot combustion gas 66 through the flowpath 78. The outer band 124 may include one or more contact faces 128 oriented in a circumferential direction C. Further, such contact faces 128 may be operable with contact faces 128 of adjacent turbine blade assemblies 101 in the circumferential direction C. In certain embodiments, the outer band 124 may be a cast interface coupled to the rest of the tip shroud 104. It should be recognized that, the tip shroud 104, in combination with tip shrouds 104 of adjacent blades within the same stage, may define a circumferential shroud 150 (see, e.g., FIGS. 5 and 6) around the airfoils 102 that is capable of reducing airfoil vibrations and improving airflow characteristics.

The flange 106 extends radially outward from the tip shroud 104. For example, the flange 106 may be coupled to the tip shroud 104, such as the outer band 124. In certain embodiments, the flange 106 may be coupled to the airfoil 102 and extend radially through the tip shroud 104 to extend radially outward from the outer band 124. In other embodiments, the flange 106 may include part of the airfoil 102 that extends through and past the outer band 124 in the radial direction R. In other embodiments, the flange 106 may include a contact build-up on the outer band 124. Still further, the flange 106 may be machined on to the outer band 124. For example, the material surrounding the flange 106 may be removed, leaving the flange 106. In another embodiment, the turbine blade assembly 100 may include a plurality of flanges 106 extending from the outer band 124.

The first compressible element 108 may be coupled to at least one of the flange 106 or the tip shroud 104 and oriented in a first circumferential direction C1. For example, the first compressible element 108 may be oriented toward an adjacent turbine blade assembly 101 in the circumferential direction C. It should be recognized that the first circumferential direction C1 may be the direction of rotation of the turbine blade assembly 100. For example, the first circumferential direction C1 may be the direction the rotating shaft 33 rotates. In other embodiments, the first circumferential direction C1 may be the opposite direction the turbine blade assembly 100 rotates. It should be recognized that the first compressible element 108 may be coupled to a plurality of flanges 106 on the outer band 124. Further, the first compressible element 108 may be coupled to two or more flanges 106 and/or the outer band 124 directly. The first compressible element 108 may be coupled to the flange 106 and/or tip shroud 104 using any suitable means, such as by adhesives, tape, braze, welding, and/or mechanical fasteners (e.g., bolts, screws, and rivets). For example, the first compressible element may be coupled to the flange using a tack welded pin (see, e.g., FIG. 7).

In one embodiment, at least two of the airfoil 102, the tip shroud 104, or the flange 106 may be formed as a unibody. For example, the airfoil 102 and the tip shroud 104 may be formed as single integral piece. In another embodiment, the unibody may include the tip shroud 104 and one or more flanges 106. In still further embodiments, all three of the airfoil 102, the tip shroud 104, and the flange 106 may be formed as a single unibody. In other embodiments, the unibody may include other components such as the platform 116 and/or dovetail 114. As such, the unibody may include the rotor blade 119. In further embodiments, the unibody may include a ceramic matrix composite (CMC).

CMC materials generally comprise a ceramic fiber reinforcement material embedded in a ceramic matrix material. The reinforcement material may be discontinuous short fibers dispersed in the matrix material or continuous fibers or fiber bundles oriented within the matrix material. The reinforcement material serves as the load-bearing constituent of the CMC in the event of a matrix crack. In turn, the ceramic matrix protects the reinforcement material, maintains the orientation of its fibers, and serves to dissipate loads to the reinforcement material. Silicon-based composites, such as silicon carbide (SiC) as the matrix and/or reinforcement material, are of particular interest to high-temperature applications, for example, high-temperature components of gas turbines including aircraft gas turbine engines and land-based gas turbine engines used in the power-generating industry. However, other ceramic-based materials are also within the scope of the invention, nonlimiting examples of which include fibers and reinforcement materials formed of titanium carbide (TiC), silicon nitride (Si3N4), and/or alumina (Al2O3). Continuous fiber reinforced ceramic composites (CFCC) are a particular type of CMC that offers light weight, high strength, and high stiffness for a variety of high temperature load-bearing applications, including shrouds, combustor liners, vanes (nozzles), blades (buckets), and other high-temperature components of gas turbines. A notable example of a CFCC material developed by the General Electric Company under the name HiPerComp® contains continuous silicon carbide fibers in a matrix of silicon carbide and elemental silicon or a silicon alloy.

Examples of CMC materials and particularly SiC/Si—SiC (fiber/matrix) CFCC materials and processes are disclosed in U.S. Pat. Nos. 5,015,540; 5,330,854; 5,336,350; 5,628,938; 6,024,898; 6,258,737; 6,403,158; and 6,503,441; and U.S. Patent Application Publication No. 2004/0067316. One such process is known as "prepreg" melt-infiltration (MI), which in general terms entails the fabrication of CMCs using multiple prepreg layers, each in the form of a tape-like structure comprising the desired reinforcement material, a precursor of the CMC matrix material, and one or more binders.

A particular embodiment of the present invention may be the ability to produce the tip shroud 104 with prepreg layers that also form at least part of the airfoil 102, such that the tip shroud 104 is a fully integrated part of the airfoil 102. Further, the prepreg layers that form part of the airfoil 102 and/or the tip shroud 104 may also form part of the flange 106 as a fully integrated part of the airfoil 102. The unitary airfoil 102, tip shroud 104, and/or flange 106 can be fabricated from ceramic-based materials produced using known processes, for example, with the use of prepregs. As a particular example, the unitary airfoil 102, tip shroud 104, and flange 106 can be fabricated by the previously-described prepreg melt-infiltration (MI) process, wherein multiple prepregs are formed to contain one or more desired reinforcement materials and a precursor of the CMC matrix material, as well as one or more binders. The prepregs undergo lay-up, are debulked and cured while subjected to elevated pressures and temperatures, and may undergo various other processing steps to form a laminate preform. Thereafter, the laminate preform may be heated (fired) in a vacuum or an inert atmosphere to decompose the binders and produce a porous preform, which can then be melt infiltrated. If the CMC material comprises a silicon carbide reinforcement material in a ceramic matrix of silicon carbide (a SiC/SiC CMC material), molten silicon is typically used to infiltrate the porosity, react with a carbon constituent (carbon, carbon source, or carbon char) within the matrix to form silicon carbide, and fill the porosity. However, it will be apparent from the following discussion that the invention also applies to other types and combinations of CMC materials. Furthermore, it is foreseeable that the unibody airfoil 102, tip shroud 104, and/or flange 106 could be fabricated with the use of materials other than prepregs, for example, plies of reinforcement material that are infiltrated after being laid-up.

Figure 3:
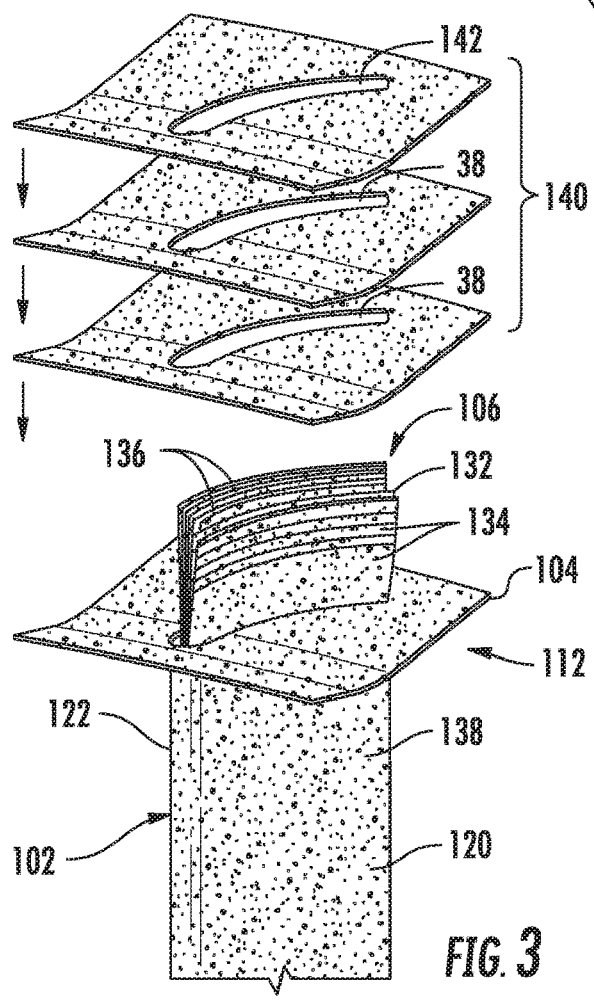
FIG. 3 illustrates a tip end of the turbine blade assembly according to aspects of the present disclosure, particularly illustrating a turbine blade assembly formed as a unibody.

FIG. 3 represents an example of tip end 112 of the airfoil 102 during its fabrication, which according to one aspect of the invention can be entirely formed of a CMC material and produced by a CMC process as described above. As represented, the airfoil 102, flange 106, and tip shroud 104 are fabricated from multiple prepreg plies. FIG. 3 represents a first set of prepreg plies 132 as being centrally located within the airfoil 102, and for convenience will be referred to as the core plies 132. Two additional sets of plies 134 and 136 are represented as being on opposite sides of the core plies 132, generally situated on the pressure side 120 and the suction side 122 of the airfoil 102, respectively. The airfoil 102 may include one or more surface plies 138 that overlie the additional plies 134 and 136 to define the surfaces of the pressure side 120 and the suction side 122. Whereas each of the interior plies 132, 134 and 136 may contain the desired reinforcement material and a suitable precursor of the desired ceramic matrix material, the surface plies 138 may not contain the reinforcement material. Encasing the reinforcement-containing plies 132, 134 and 136 with the reinforcement-free plies 138 may serve to avoid the exposure of reinforcement fibers at the surfaces of the airfoil 102 at the completion of the fabrication process.

It should be appreciated that various numbers of prepreg plies 132, 134, 136, and 138 could be incorporated into the construction of the airfoil 102 of the rotor blade 119. As represented in FIG. 3, roughly equal numbers of prepreg plies may make up the set of plies 134 and 136. To build up a suitable thickness for the airfoil 102 while achieving its uniformly contoured pressure side 120 and suction side 122, the additional plies 134 and 136 are represented as having roughly equal span-wise lengths and roughly equal chord-wise widths, though it should be understood that their lengths and widths could vary, for example, as a result of increasing or decreasing in length and/or width to yield what may be referred to as a stepped formation facing or facing away from the core plies 132. Accordingly, shapes and sizes of the plies 132, 134 and 136 other than the particular shapes and sizes represented in FIG. 3 are foreseeable and within the scope of the invention.

As further represented in FIG. 3, in certain embodiments, only the plies 132, 134 and 136 may extend into the tip end 112 of the airfoil 102, and these plies 132, 134 and 136 may be assembled with additional prepreg plies 140 to produce the tip shroud 104 with the flange 106 extending in the radial direction R. Each of the additional prepreg plies 140, hereinafter referred to as insert plies 140, may contain a reinforcement material and a suitable precursor for a desired ceramic matrix material. The reinforcement material and ceramic matrix material of the insert plies 140 may be, though not necessarily, the same as those for the plies 132, 134 and 136. The insert plies 140 may be assembled in an interweaving manner with the plies 134, 136 during the process of fabricating the tip shroud 104. In particular, a portion of the plies 134, 136 may be individually folded and/or folded in groups of limited numbers in opposite directions away from the core plies 132 so that the folded plies 134, 136 are oriented transverse to the span-wise direction of the airfoil 102 to form a portion of the tip shroud 104. Further, the insert plies 140 may be individually assembled or assembled in groups of limited numbers with the folded plies 134, 136. For purposes of their assembly with the plies 134, 136, each insert ply 140 can be formed to have a central opening 142 corresponding in size and shape to the outer peripheral shape defined by at least the core plies 132 and, in some circumstances, also the plies 134, 136 that may form the flange 106.

Figure 4:
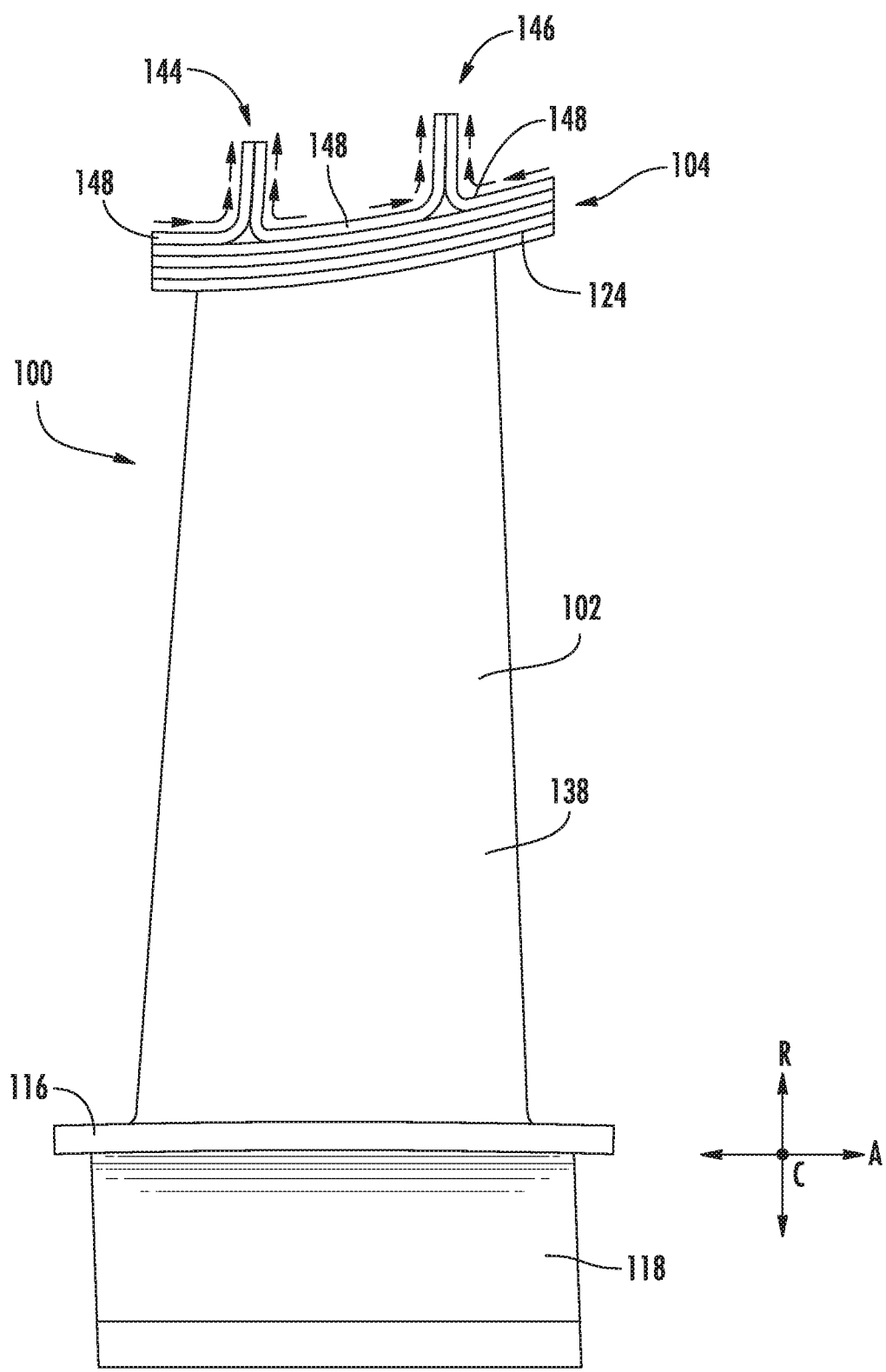
FIG. 4 illustrates a side view of another embodiment of the turbine blade assembly according to aspects of the present disclosure, particularly illustrating the turbine blade assembly including a first seal tooth.

Referring now to FIG. 4, a side view of another embodiment of the turbine blade assembly 100 is illustrated according to aspects of the present disclosure. Particularly, FIG. 4 illustrates the turbine blade assembly 100 including a first seal tooth 144. The first seal tooth 144 may extend radially outward from the tip shroud 104, such as the outer band 124 of the tip shroud 104. For example, the first seal tooth 144 may extend along the full length of the outer band 124 in the circumferential direction C and also extend radially out from the outer band 124 in the radial direction R. The first seal tooth 144 may be in sealing engagement with the outer casing 18 of the gas turbine engine 10 (see, e.g., FIG. 1). For example, the outer casing 18 may define one or more slots to receive the first seal tooth 144. The first seal tooth 144 may prevent the hot combustion gases 66 from leaking past the tip shroud 104 and flowing axially down any gap or cavities between the tip shroud 104 and the outer casing 18.

Another embodiment, the turbine blade assembly 100 may include a second seal tooth 146 extending radially outward from the outer band 124 of the tip shroud 104. The second seal tooth 146 may be positioned aft of the first seal tooth 144 in the axial direction A. It should be recognized the seal teeth 144, 146 may axially enclose the flange 106 (see, e.g., FIGS. 7-9). In embodiments where the turbine blade assembly 100 includes at least one of the first seal tooth 144 or the second seal tooth 146, the at least one of the seal teeth 144, 146 may be formed as a unibody with at least one other components of the turbine blade assembly 100. For example, in certain embodiments, at least two of the airfoil 102, the tip shroud 104, the flange 106, or the first seal tooth 144 may be formed as the unibody, such as a unibody including a ceramic matrix composite.

To fabricate the seal teeth 144, 146 in FIG. 4 as a CMC unibody, prepreg top plies 148 are represented as being laid-up and deformed so that first portions of the top plies 148 conform to an outermost surface of the tip shroud 104 and second portions of the top plies 148 are folded so as to be transverse to the tip shroud 104, such as aligned with the airfoil 102 in the radial direction R to form the seal teeth 144, 146. As with the reinforcement-free surface plies 138 that define the pressure side 120 and suction side 122 of the airfoil 102 and the radially inward surface of the tip shroud 104, at least the outermost top plies 148 may be fabricated to be free of reinforcement material so that fibers will not be exposed at the outer surfaces of the seal teeth 144, 146 at the completion of the fabrication process. The innermost top plies 148 may contain reinforcement material for the purpose of increasing the strength of the seal teeth 144, 146. The seal teeth 144, 146 and/or the tip shroud 104 may contain further or additional plies to fill in voids or gaps created. It should also be recognized that, in other embodiments, the flange 106 may be formed on the tip shroud 104 using the same process as forming the seal teeth 144, 146.

To complete the manufacturing of the turbine blade assembly 100 and its flange 106 and tip shroud 104, the laid-up prepreg plies 132, 134, 136, 138, 140, and 148 are preferably debulked prior to undergoing curing, followed by firing during which binders are burned-off and the ceramic precursor is converted to the desired ceramic matrix material for the reinforcement material. Suitable debulking, curing and firing processes, as well as any additional processes necessary to achieve the final desired shape and properties of the turbine blade assembly 100, are known in the art and therefore will not be described further. Though one method of forming a unibody rotor blade assembly 100 from CMC materials has been described, those of ordinary skill in the art will recognize other methods may be utilized with more or less plies and in other arrangements of plies to form the unibody and the various components described herein.

Figure 5:
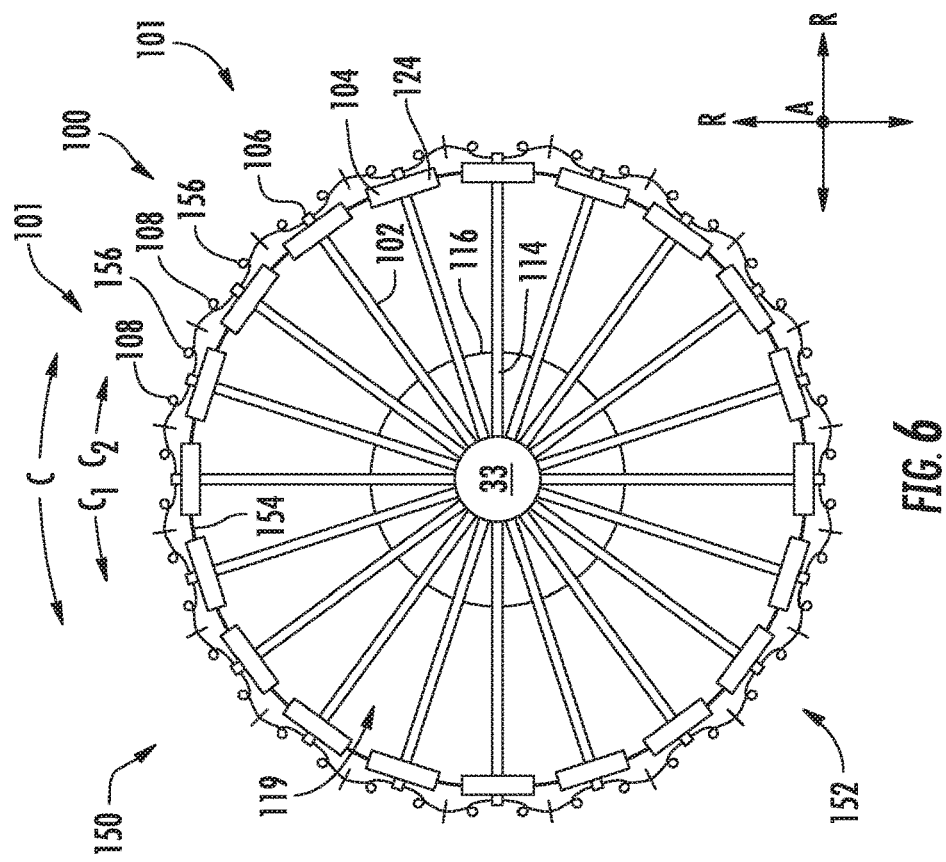
FIG. 5 illustrates a schematic view of one embodiment of a circumferential shroud according to aspects of the present disclosure, particularly illustrating a shroud assembly utilized to form the circumferential shroud.

Referring now to FIG. 5, a schematic view of one embodiment of the circumferential shroud 150 is illustrated according to aspects of the present disclosure. Particularly, FIG. 5 illustrates a shroud assembly 152 utilized to form the circumferential shroud 150, such as from the individual turbine blade assemblies 100. As illustrated, the first compressible element 108 may operable with an adjacent turbine blade assembly 101 to provide a force in the first circumferential direction C1 or a second circumferential direction C2 opposite the first circumferential direction. For example, the first compressible element 108 may be in compression with a component of the adjacent turbine blade assembly 101 in the first circumferential direction C1. By compressing the first compressible element 108, the first compressible element 108 may supply a contra force opposite the adjacent turbine assembly 101, i.e., in the second circumferential direction C2. In another embodiment, the first compressible element 108 may be in tension with the component of the adjacent turbine blade assembly 101. In such embodiments, the first compressible element 108 may supply a force in the same direction as the adjacent turbine assembly 101, i.e., in the first circumferential direction C1.

FIG. 5 also illustrates a shroud assembly 152 for joining rotor blades 119 together. It should be recognized the rotor blades 119 may be a portion of the rotor blade assemblies 100 as described in regards to FIG. 2-4, such as the airfoil 102, platform 116 and dovetail 114. The shroud assembly 152 may include a plurality of tip shrouds 104, a plurality of flanges 106, and a plurality of first compressible elements 108. As such, the shroud assembly 152 may also include a portion of the rotor blade assembly 100. It should be recognized the turbine blade assemblies 100 and the components thereof may be configured generally as the turbine blade assembly 100 of FIGS. 2-4. For example, each of the plurality of tip shrouds 104 may include the outer band 124. Further, each of the plurality of tip shrouds 104 may be coupled to one of the plurality of rotor blades 119 at the tip end 112 such as to the airfoil 102. Each of the plurality of flanges 106 may extend radially outward from one of the plurality of tip shrouds 104. Each of the plurality of first compressible elements 108 may be coupled to at least one of the plurality of flanges 106 or one of the plurality of tip shrouds 104 and oriented in the first circumferential direction C1. Though the first circumferential direction C1 is illustrated as counter-clockwise in FIG. 5, it should be recognized that the first circumferential direction C1 may be clockwise and the second circumferential direction C2 may be counter-clockwise in other embodiments.

Each of the plurality of first compressible elements 108 may be oriented toward an adjacent tip shroud 104 of an adjacent turbine blade assembly 101 such that the tip shrouds 104 mechanically engage to form the circumferential shroud 150. For example, a compressive force supplied by each of the first plurality of compressible elements 108 may keep each of the plurality of tip shrouds 104 engaged with their respective adjacent tip shrouds 104 in the first circumferential direction C1. It should be recognized that friction between each first compressible element 108 and its respective adjacent tip shroud 104 may reduce displacements of the tip shrouds 104 and/or rotor blades 119 in the radial direction R and/or the axial direction A.

In a still further embodiment, the shroud assembly 152 may include a plurality of seal teeth 144, 146 (omitted for clarity) as depicted in FIGS. 4 and 7-9. Each of the plurality of seal teeth 144, 146 may extend radially outward from one of the plurality of tip shrouds 104. For example, the seal teeth 144, 146 may extend from the outer band 124. In further embodiments, the shroud assembly 152 may include a plurality of additional sealing elements 154 positioned between the tip shrouds 104 in the circumferential direction C. Such additional sealing elements 154 may reduce the amount of hot combustion gases 66 that flow between the tip shrouds 104 instead of through the flowpath 78 defined between radially between the tip shrouds 104 and the platform 116. It should be recognized that the sealing elements 154 may accommodate a variable gap between the tip shrouds 104. For example, the gaps between tip shrouds 104 may be at a maximum value when the gas turbine engine 10 is operating at a maximum RPM. Similarly, the gaps between tip shrouds 104 may be a minimum value when the gas turbine engine 10 is operating at a minimum RPM.

Still referring to the embodiment of FIG. 5, the plurality of tip shrouds 104 and plurality of first compressible elements 108 may be arranged in series to define a circular profile and form the circumferential shroud 150. It should be recognized that the assembled circumferential shroud 150 may define the outer boundary of the flowpath 78 for hot combustion gases 66 at its respective turbine stage. Further, the circumference of the circumferential shroud 150 may be variable based on the operating condition of the gas turbine engine 10. For example, at low RPMs such as at idle or when the gas turbine engine 10 is off, the circumferential shroud 150 may define a relatively smaller circumference. When the gas turbine engine 10 is operating at higher RPMs, such as at a take-off condition or cruise condition, inertia of the rotating rotor blades 119 may expand the rotor blades 119 in the radial direction R. Such expansion may displace the tip shrouds 104 outward in the radial direction R and cause the circumferential shroud 150 to define a relatively larger circumference.

It should also be recognized that the hot combustion gases 66 flowing past the rotor blades 119 may also cause thermal expansion of the rotor blades 119 and/or the tip shrouds 104. Such thermal expansion may also increase the circumference of the circumferential shroud 150. It should be recognized that the first compressible element 108 may be compressed more when the circumferential shroud 150 has a smaller circumference, thereby supplying a greater force to keep the plurality of tip shrouds 104 engaged with their respective adjacent tip shrouds 104 in the first circumferential direction C1. Further, the first compressible elements 108 may be compressed less when the circumferential shroud 150 has a larger circumference, thereby supplying a smaller force to keep the plurality of tip shrouds 104 engaged with their respective adjacent tip shrouds 104 in the first circumferential direction C1.

In one embodiment, each of the plurality of first compressible elements 108 may be coupled to at least one of an adjacent flange 106 or tip shroud 104 in the first circumferential direction C1 such that the each of the first compressible elements 108 couples two of the plurality of tip shrouds 104 together. In such an embodiment, the plurality of first compressible elements 108 may couple the plurality of tip shrouds 104 together such that the entire circumferential shroud 150 is formed substantially as a complete ring, each tip shroud 104 segment coupled in series to the next tip shroud 104 in the first circumferential direction C1. Further, it should be recognized that in such embodiments the first compressible elements 108 may be in tension when the circumferential shroud 150 defines a larger circumference, such as a maximum circumference. In such embodiments, the force applied by each of the first compressible elements 108 oriented in the first circumferential direction C1 may also be in the first circumferential direction C1. Further, in other embodiments, the first compressible elements 108 may be in tension throughout various operating conditions of the gas turbine engine 10, such as when the circumferential shroud 150 defines a smaller circumference.

In certain embodiments, each of the plurality of first compressible elements 108 may include a first Young's modulus, and each of the plurality of tip shrouds 104 may include a second Young's modulus. In such embodiments, the first Young's modulus may be less than the second Young's modulus. As such, each of the plurality of first compressible elements 108 may be more elastic than each of the plurality of tip shrouds 104. Further, the first Young's modulus may be less than a third Young's modulus of the plurality of rotor blades 119 such that the plurality of first compressible elements 108 is more elastic than the plurality of rotor blades 119. In one embodiment, the third Young's modulus may be approximately the same as the second Young's modulus, e.g., when the turbine blade assembly 100 is formed in one unibody.

Figure 6:
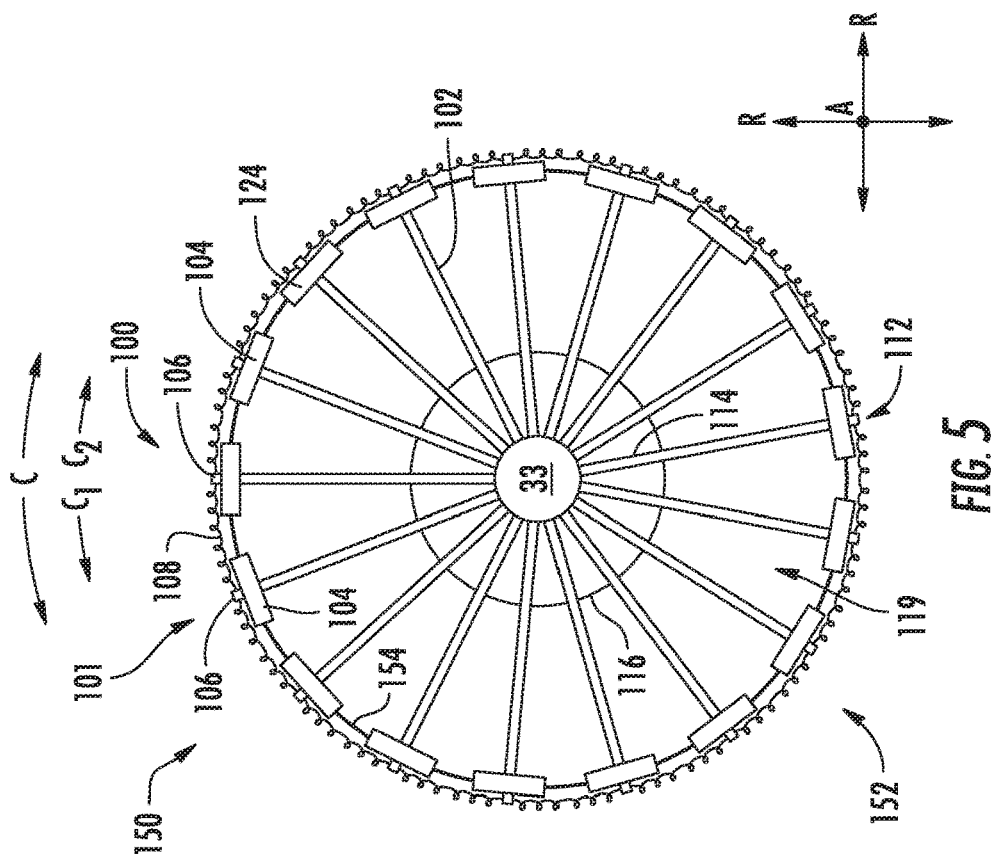
FIG. 6 illustrates schematic view of another embodiment of the rotor blade assembly and shroud assembly according to aspects of the present disclosure, particularly illustrating the rotor blade assembly and shroud assembly with a second compressible element.

Referring now to FIG. 6, schematic view of another embodiment of the rotor blade assembly 100 and shroud assembly 152 is illustrated according to aspects of the present disclosure. Particularly, FIG. 6 illustrates the rotor blade assembly 100 and shroud assembly 152 with a second compressible element 156. For example, the turbine blade assembly 100 may include a second compressible element 156 coupled to at least one of the flange 106 or the tip shroud 104 and oriented in the second circumferential direction C2. The second compressible element 156 may be mechanically operable with another adjacent turbine blade assembly 101 to provide a force in the first circumferential direction C1 or the second circumferential direction C2. For example, the second compressible element 156 may be in compression between the rotor blade assembly 100 and a component of the adjacent turbine blade assembly 101 in the second circumferential direction C2. By compressing the second compressible element 156, the second compressible element 156 may supply a contra force opposite the adjacent turbine blade assembly 101, i.e., in the first circumferential direction C1. It should be further understood that the turbine blade assembly 100 may further include any of the additional features as described herein.

The shroud assembly 152 may further include a plurality of the second compressible elements 156 coupled to at least one of the plurality of flanges 106 or one of the plurality of tip shrouds 104 and oriented in the second circumferential direction C2 opposite the first circumferential direction C1. For example, each of the plurality of first compressible elements 108 may be in mechanical engagement with one of the plurality of second compressible elements 156 of an adjacent turbine blade 101 in the first circumferential direction C1 to form the circumferential shroud 150. In such embodiments, a compressive force of the first compressible element 108 and/or the second compressible element 156 may keep the each of the plurality of tip shrouds 104 engaged with their respective adjacent tip shrouds 104 in both the first and second circumferential directions C1, C2. It should be recognized that friction between each first compressible element 108 and the adjacent second compressible element 156 may reduce displacements of the tip shrouds 104 and/or rotor blades 119 in the radial and/or the axial directions R, A. The plurality of tip shrouds 104, plurality of first compressible elements 108, and the plurality of second compressible elements 156 may be arranged in series to define a circular profile and form the circumferential shroud 150.

In one configuration, each of the plurality of first compressible elements 108 may be coupled to one of the plurality of second compressible elements 156. In such an embodiment, the plurality of first compressible elements 108 and plurality of second compressible elements 156 may couple the plurality of tip shrouds 104 together such that the entire circumferential shroud 150 is formed substantially as a complete ring, each tip shroud 104 segment coupled in series to the next tip shroud 104 in the first circumferential direction C1 via both the first compressible element 108 and the second compressible element 156. Further, it should be recognized that in such embodiments the first compressible element 108 and second compressible element 156 may be in tension for at least part of the operating profile of the gas turbine engine 10.

Figure 7:
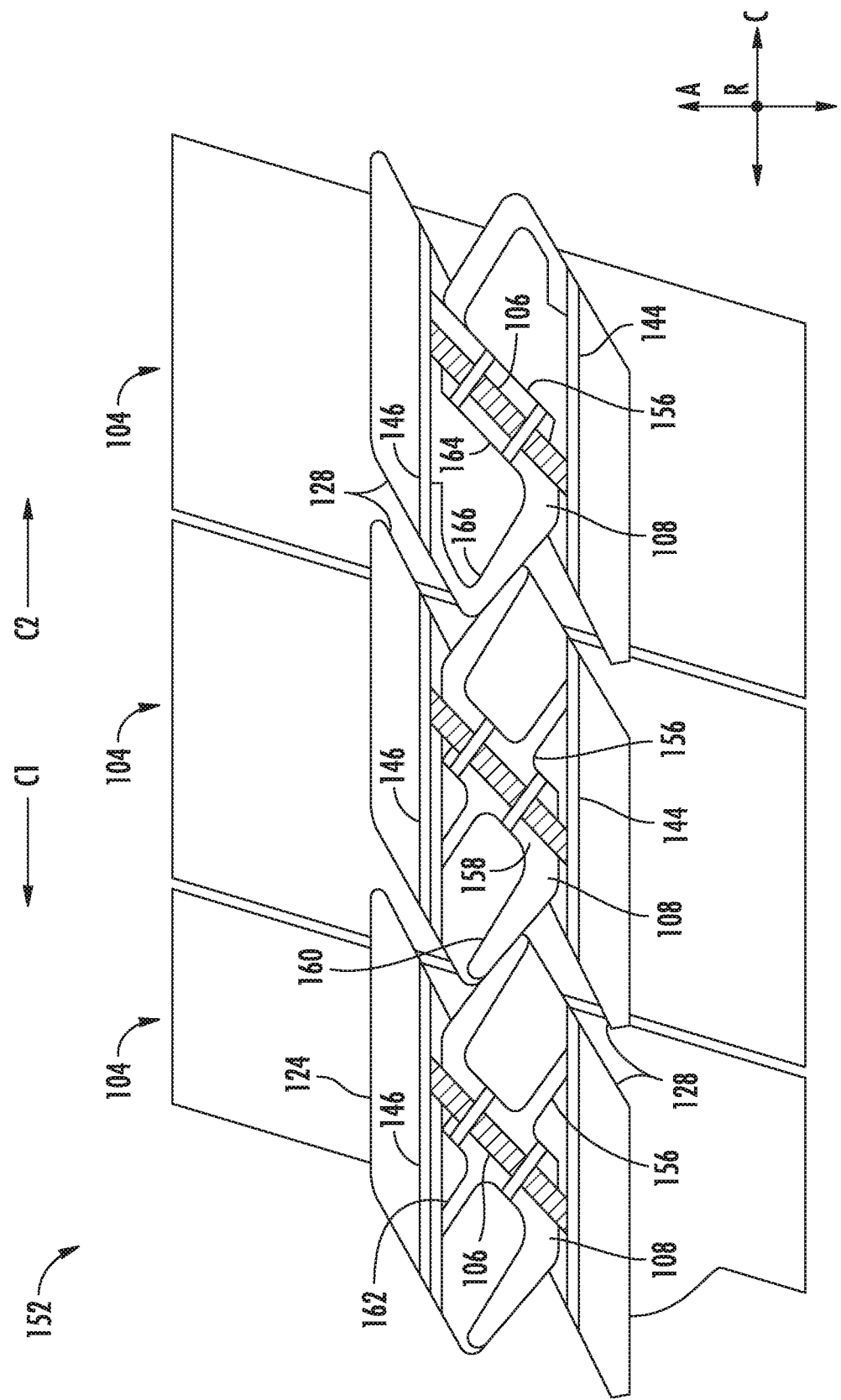
FIG. 7 illustrates a top view of one embodiment of the seal assembly according to aspects of the present disclosure, particularly illustrating the seal assembly with leaf spring compressible elements.

Referring now to FIG. 7, a top view of one embodiment of the shroud assembly 152 is illustrated according to aspects of the present disclosure. Particularly, FIG. 7 illustrates the shroud assembly 152 with spring compressible elements 108, 156. For example, at least one of the plurality of first compressible elements 108 may include a spring. For instance, the spring may include a first segment 158 coupled to the flange 106 and/or the tip shroud 104 and a second segment 160 extending from the first segment 158 and oriented generally in the first circumferential direction C1 toward the adjacent tip shroud 104. In certain embodiments, the spring may include a third segment 162 coupling the spring to one of the seal teeth 144, 146 and/or the tip shroud 104. For example, the spring may generally define an "F" profile. In further embodiments, the third segment 162 may also be oriented toward the adjacent tip shroud 104 to mechanically engage the tip shrouds 104. For example, the first compressible element 108 may mechanically engage the tip shroud 104 of an adjacent turbine blade assembly 101 and/or may mechanically engage with a second compressible element 156 of the adjacent tip shroud 104. The second compressible element 156 may be configured generally as the spring of the first compressible element 108; however, the second compressible element 156 may be oriented in the second circumferential direction C2. The compressible elements 108, 156 may be mechanically engaged via friction and the compressive force between the compressible elements 108, 156. In other embodiments, the compressible elements 108, 156 may be coupled together.

In another embodiment, the spring may define a "C" profile with a bottom portion 164 and a top portion 166. In certain configurations, the bottom portion 164 may be coupled to one of the tip shroud 104 or the flange 106. The top portion 166 may be oriented toward the adjacent tip shroud 104 to mechanically engage the tip shrouds 104. In certain embodiments, the top portion 166 may extend back toward the tip shroud 104 (e.g., generally in the second circumferential direction C2 for the first compressible element 108) to couple to at least one of the outer band 124 or the seal tooth 144, 146 to further secure the spring to the tip shroud 104. It should be recognized that, in further embodiments, the spring may have any configuration that allows the compressible elements 108 and 156 to mechanically engage each other or adjacent tip shrouds 104 and/or flanges 106.

Figure 8:
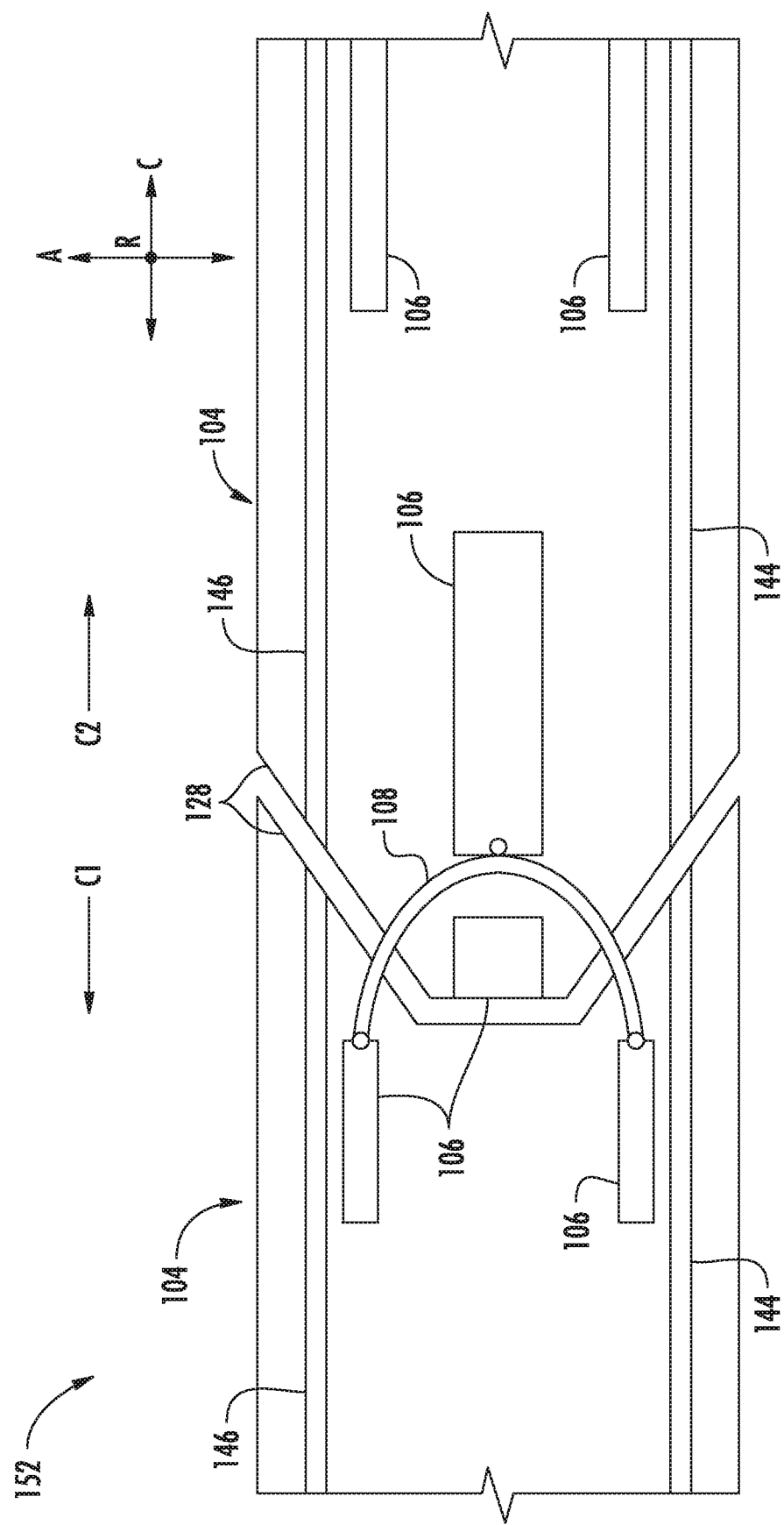
FIG. 8 illustrates a top view of another embodiment of the shroud assembly according to aspects of the present disclosure, particularly illustrating the shroud assembly with a leaf spring compressible element.

Referring now to FIG. 8, a top view of another embodiment of the shroud assembly 152 is illustrated according to aspects of the present disclosure. Particularly, FIG. 8 illustrates the shroud assembly 152 with a compressible element 108, 156 configured as a leaf spring. For instance, at least one of the plurality of first compressible elements 108 may include a leaf spring oriented in generally the first circumferential direction C1. Though, in other embodiments, the second compressible element 156 may be a leaf spring oriented generally in the second circumferential direction C2. The leaf spring may be coupled to one of the plurality of tip shrouds 104 and/or one of the plurality of flanges 106. It should be recognized that the leaf spring may be coupled to one of the tip shroud 104 and/or flange 106 or the adjacent tip shroud 104 and/or flange 106 at multiple locations, such as two locations. For example, in the illustrated embodiment, the leaf spring may have three points of contact. Further, the leaf spring may be in a compressed state or a tensed state depending on the operating condition of the gas turbine engine 10 and/or the circumference of the circumferential shroud 150. In certain embodiments, the leaf spring may be a single leaf. In other embodiments, the leaf spring may be a multi-leaf spring.

Figure 9:
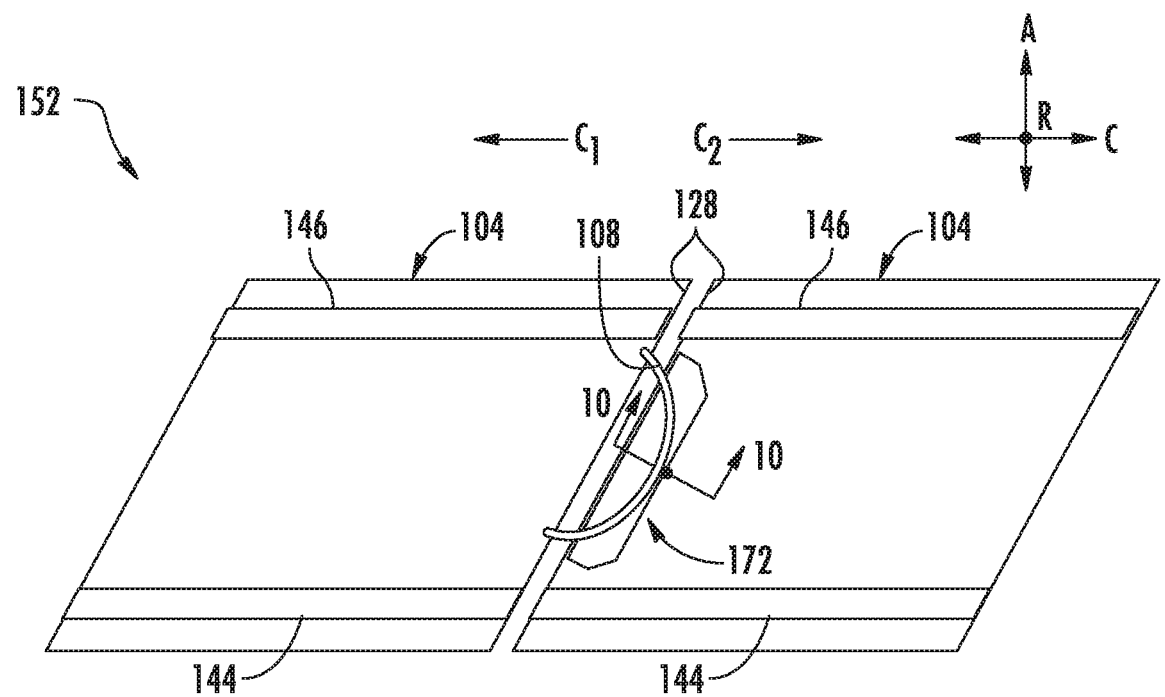
FIG. 9 illustrates another embodiment of the shroud assembly with the compressible element configured as a leaf spring according to aspects of the present disclosure, particularly illustrating the shroud assembly where the leaf spring is housed in a notch of the tip shroud.
Figure 10:
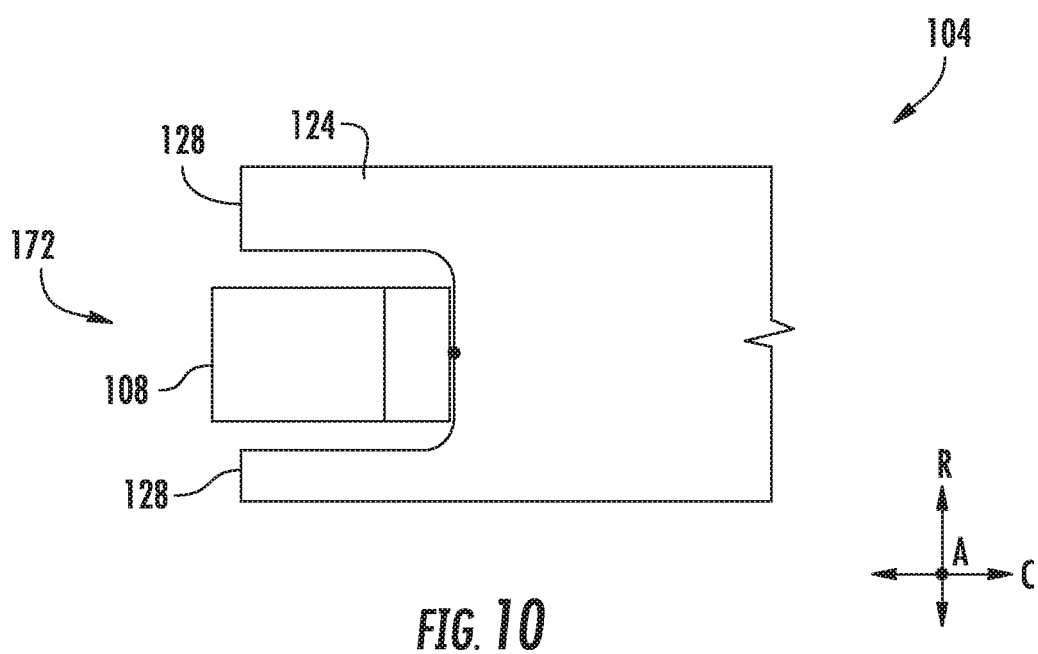
FIG. 10 illustrates a cross-section of a tip shroud of the shroud assembly of FIG. 9 along section line 10-10 according to aspects of the present disclosure.

Referring now to FIGS. 9 and 10, another embodiment of the shroud assembly 152 with the compressible element 108 configured as a leaf spring is illustrated according to aspects of the present disclosure. Particularly, FIG. 9 illustrates the shroud assembly 152 where the leaf spring is housed in a notch 172 of the tip shroud 104. Further, FIG. 10 depicts a cross-section of a tip shroud 104 of the shroud assembly 152 along section line 10-10 of FIG. 9. The leaf spring of FIGS. 9 and 10 may generally be configured the same or similar to the leaf spring of FIG. 8. For example, the leaf spring may be coupled to one of the tip shroud 104 and/or the flange 106 or the adjacent tip shroud 104 and/or flange 106 at multiple locations, such as two locations. For instance, in the depicted embodiment, the leaf spring is directly coupled to each of the tip shrouds 104.

However, the tip shroud(s) 104 of FIGS. 9 and 10 may define a notch 172 on one or more of the contact faces 128 for housing the leaf spring. For example, the leaf spring may be coupled to the outer band 124 of the tip shroud(s) 104 within the notch 172. By housing the leaf spring within the notch 172, the leaf spring may be at least partially protected from the flow of the hot combustion gas 66 (see, FIG. 1). Further, housing the leaf spring within the notch 172 may help to prevent incidental contact with the leaf spring, potentially damaging the leaf spring or altering the orientation of the tip shrouds 104 forming the shroud assembly 152. Further, it should be recognized that adjacent tip shrouds 104 define a similar notch 172 to receive the leaf spring. In other embodiments, each tip shroud may include one notch 172 in one circumferential direction (e.g., the first circumferential direction C1) and a flat contact face 128 in the opposite circumferential direction (e.g., the second circumferential direction C2) configured to be coupled to the leaf spring, such as at one or more locations as described in FIG. 8).

Figure 11:
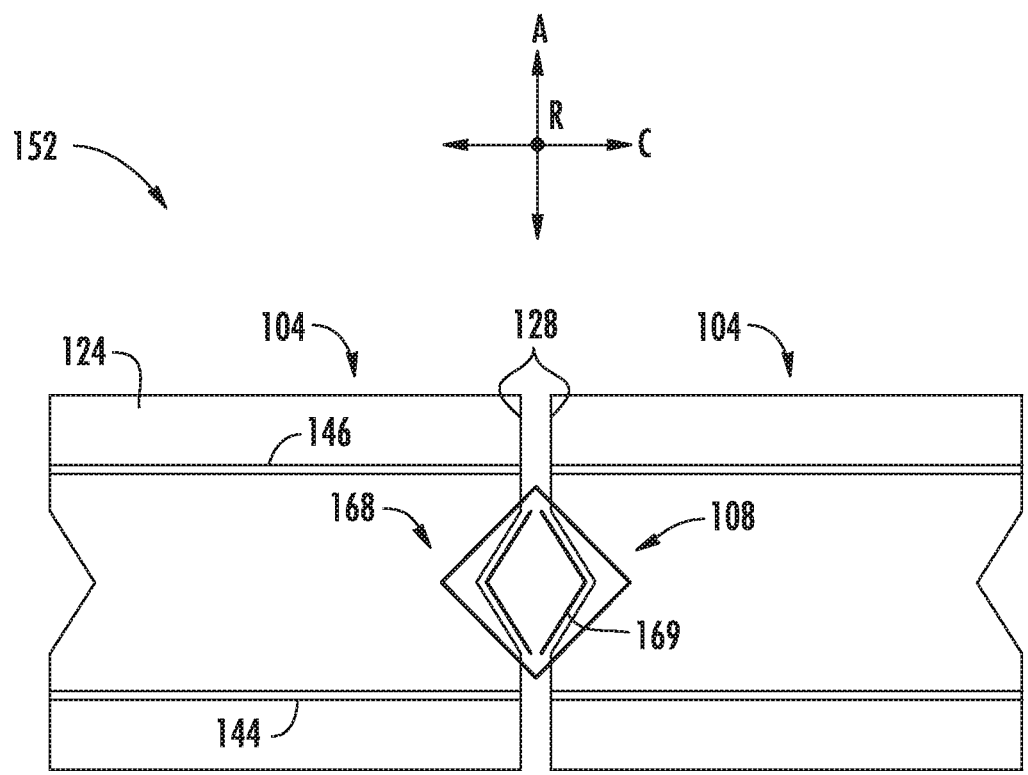
FIG. 11 illustrates a top view of another embodiment of the shroud assembly according to aspects of the present disclosure, particularly illustrating the shroud assembly with a prismatic spring compressible element.
Figure 12:
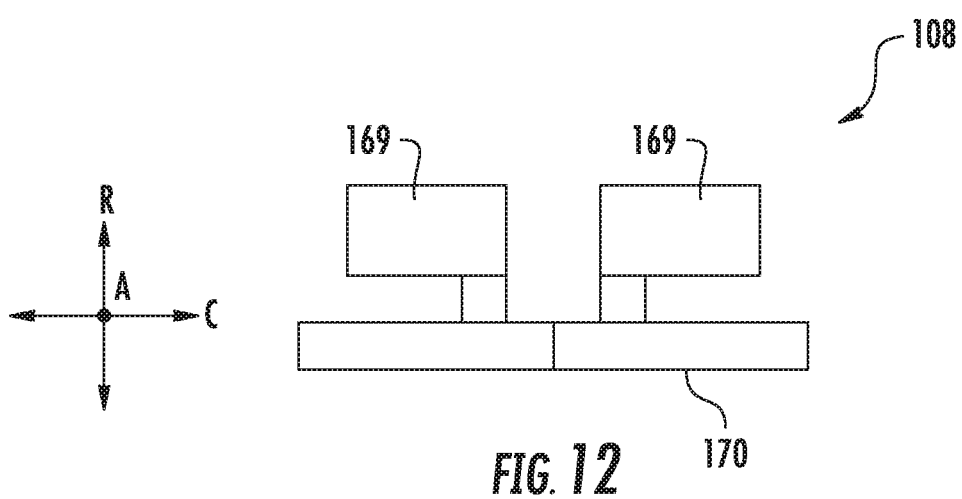
FIG. 12 illustrates a side view of the prismatic spring of FIG. 11 according to aspects of the present disclosure.

Referring now to FIGS. 11 and 12, a further embodiment of the shroud assembly 152 and first compressible element 108 is illustrated according to aspects of the present disclosure. Particularly, FIG. 11 illustrates the first compressible element 108 configured as a prismatic spring, and FIG. 12 illustrates a side view of the prismatic spring of FIG. 11. For example, in such an embodiment, the tip shroud 104, such as the outer band 124, may define one or more slashfaces 168 configured to receive the prismatic spring. As such, the prismatic spring and each slashface 168 may define a male-female interface to secure the prismatic spring. The prismatic spring may include one or more compressible components 169. The compressible component(s) 169 may provide the compressive or tensile force between adjacent tip shrouds 104. In certain embodiments, the prismatic spring may be coupled to at least one of the plurality of tip shrouds 104, such as at the outer band 124. Still, in other embodiments, the prismatic spring may be oriented between adjacent tip shrouds 104 and coupled to both of the adjacent tip shrouds 104. In one embodiment, the prismatic spring may be secured between adjacent tip shrouds 104 via the compressive force and/or friction between the prismatic spring and the adjacent tip shrouds 104. In such embodiments, as shown particularly in FIG. 12, the prismatic spring may include a spring platform 170 extending circumferentially and/or radially below the outer band 124 to secure the prismatic spring from radially outward displacements.

Figure 13:
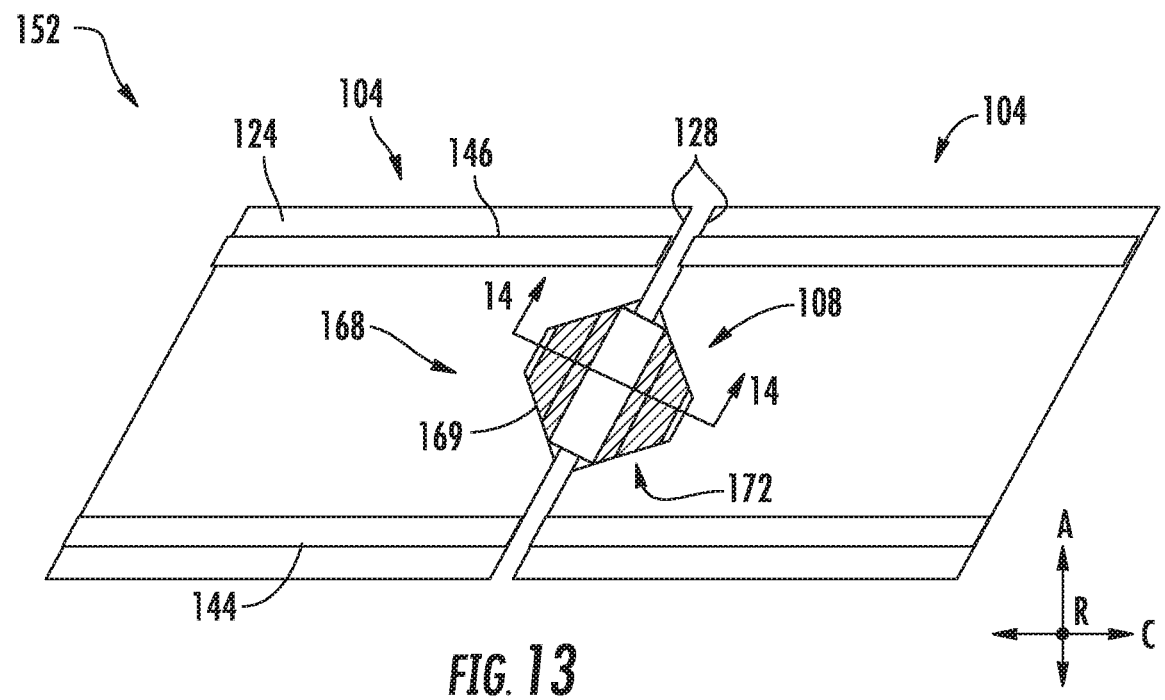
FIG. 13 illustrates another embodiment of the shroud assembly where the compressible element is configured as a prismatic spring according to aspects of the present disclosure, particularly illustrating the shroud assembly where the prismatic spring is housed in a notch of the tip shroud.
Figure 14:
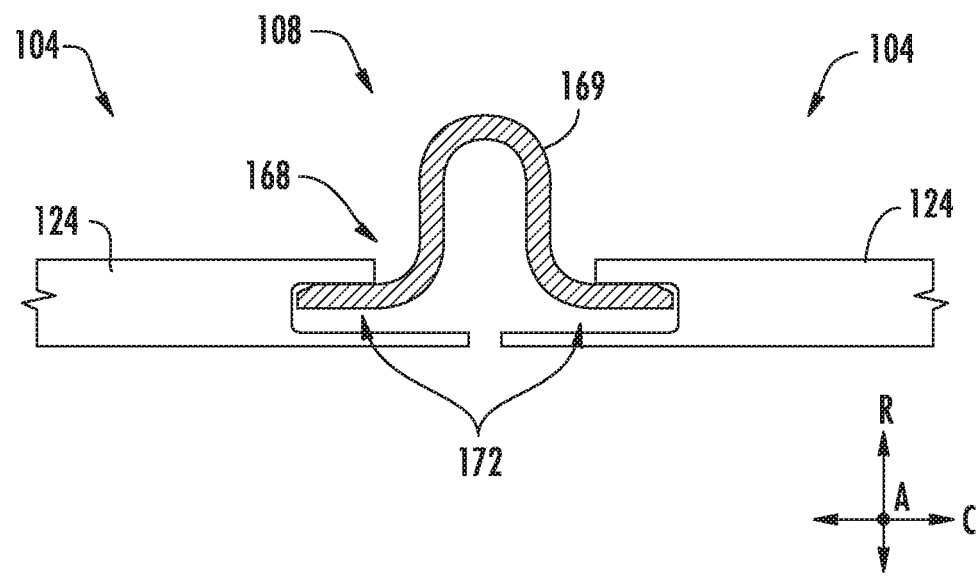
FIG. 14 illustrates a cross-section of the tip shrouds of the shroud assembly of FIG. 13 along section line 14-14 according to aspects of the present disclosure.

Referring now to FIGS. 13 and 14, a further embodiment of the shroud assembly 152 where the first compressible element 108 is configured as the prismatic spring is illustrated according to aspects of the present disclosure. Particularly, FIG. 13 illustrates the shroud assembly 152 where the prismatic spring is housed in the notch 172 of the tip shroud 104. Further, FIG. 14 illustrates a cross-section of the tip shrouds 104 of the shroud assembly 152 along section line 14-14 of FIG. 13. The prismatic spring of FIGS. 13 and 14 may generally be configured the same or similar to the prismatic spring of FIGS. 11 and 12. For example, the prismatic spring may define a male-female interface with one or more slashfaces 168 configured to receive the prismatic spring. Further, the prismatic spring may include the compressible component(s) 169.

However, for the illustrated prismatic spring of FIGS. 13 and 14, the prismatic spring may be defined by the compressible component 169. For instance, the prismatic spring may include one compressible component 169, though, in other embodiments, the prismatic spring may include a plurality of compressible components 169. Further, the tip shroud(s) 104 of FIGS. 13 and 14 may define the notch 172 on one or more of the contract faces 128 and/or the slashface 168 for housing at least a portion of the prismatic spring. As shown, each of the adjacent tip shrouds 104 may include a notch 172 such that the prismatic spring is set within the tip shrouds 104. Though in other embodiments, each tip shroud 104 may include one notch 172 in one circumferential direction (e.g., the first circumferential direction C1) and a flat slashface 168 and/or contact face 128 in the opposite circumferential direction (e.g., the second circumferential direction C2). Further, it should be recognized that the prismatic spring of FIGS. 13 and 14 may be secured within the notch 172 by coupling, or, in other embodiments, the compressive force and/or friction between the prismatic spring and the adjacent tip shroud(s) 104 may secure the prismatic spring within the notch 172.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine engine including a plurality of rotor blades, the shroud assembly comprising:

a plurality of tip shrouds, each tip shroud of the plurality of tip shrouds including an outer band, wherein each tip shroud of the plurality of tip shrouds is coupled to one rotor blade of the plurality of rotor blades at a tip end of the rotor blade;

a plurality of flanges, each flange of the plurality of flanges extending radially outward from one tip shroud of the plurality of tip shrouds; and a plurality of first compressible elements, each first compressible element of the plurality of first compressible elements comprising a first segment and at least one flange of the plurality of flanges extending lengthwise parallel to and butting one another, the first segment coupled to the at least one flange or to one tip shroud of the plurality of tip shrouds, and a second segment extending from the first segment perpendicular to the first segment and oriented in a first circumferential direction, wherein the second segment of the first compressible element is oriented toward an adjacent tip shroud of the plurality of tip shrouds such that the plurality of tip shrouds mechanically engage to form a circumferential shroud.

2. The shroud assembly of claim 1, wherein each first compressible element of the plurality of first compressible elements is coupled to at least one of an adjacent flange or the adjacent tip shroud in the first circumferential direction such that the first compressible element couples the plurality of tip shrouds together.

3. The shroud assembly of claim 1, wherein the shroud assembly further comprises:

a plurality of second compressible elements, each second compressible element of the plurality of second compressible elements is coupled to the at least one flange of the plurality of flanges or the one tip shroud of the plurality of tip shrouds and oriented in a second circumferential direction opposite the first circumferential direction, wherein each first compressible element is in mechanical engagement with one second compressible element of the plurality of second compressible elements of an adjacent rotor blade in the first circumferential direction to form the circumferential shroud.

4. The shroud assembly of claim 3, wherein each first compressible element of the plurality of first compressible elements is coupled to one second compressible element of the plurality of second compressible elements.

5. The shroud assembly of claim 1, wherein the tip shroud and the flange extending from the tip shroud comprise a ceramic matrix composite.

6. The shroud assembly of claim 1, wherein the tip shroud, the flange extending from the tip shroud, and an airfoil of the rotor blade coupled to the tip shroud comprise a ceramic matrix composite.

7. The shroud assembly of claim 1, wherein the tip shroud and an airfoil of the rotor blade coupled to the tip shroud comprise a ceramic matrix composite.

8. The shroud assembly of claim 1, wherein each first compressible element of the plurality of first compressible elements includes a first Young's modulus, and each tip shroud of the plurality of tip shrouds includes a second Young's modulus, and wherein the first Young's modulus is less than the second Young's modulus.

9. The shroud assembly of claim 1, wherein at least one first compressible element of the plurality of first compressible elements comprises a spring.

10. The shroud assembly of claim 1, wherein at least one first compressible element of the plurality of first compressible elements comprises a leaf spring.

11. The shroud assembly of claim 1, wherein at least one first compressible element of the plurality of first compressible elements comprises a prismatic spring.

12. The shroud assembly of claim 1, further comprising:

a plurality of seal teeth, each seal tooth of the plurality of seal teeth extending radially outward from one tip shroud of the plurality of tip shrouds at the outer band.

13. The shroud assembly of claim 12, wherein the plurality of tip shrouds and the plurality of seal teeth comprise a ceramic matrix composite.

14. A turbine blade assembly for a gas turbine engine, wherein the gas turbine engine includes a rotating shaft drivingly coupling a compressor and a turbine, the turbine blade assembly comprising:

an airfoil having a body extending radially from a root end coupled to the rotating shaft to a tip end;

a tip shroud including an outer band coupled to the tip end;

a flange extending radially outward from the tip shroud; and a first compressible element comprising a first segment coupled to at least one of the flange or the tip shroud, each of the first segment and the flange extending lengthwise parallel to and butting one another, and a second segment extending from the first segment perpendicular to the first segment and oriented in a first circumferential direction toward an adjacent tip shroud, wherein the first compressible element is mechanically operable with an adjacent turbine blade assembly to provide a force in the first circumferential direction or a second circumferential direction opposite the first circumferential direction.

15. The turbine blade assembly of claim 14, wherein at least two of the airfoil, the tip shroud, or the flange comprise a ceramic matrix composite.

16. The turbine blade assembly of claim 14, wherein the airfoil, the tip shroud, and the flange comprise a ceramic matrix composite.

17. The turbine blade assembly of claim 14, further comprising:

a first seal tooth extending radially outward from the outer band of the tip shroud.

18. The turbine blade assembly of claim 17, wherein at least two of the airfoil, the tip shroud, the flange, or the first seal tooth comprise a ceramic matrix composite.

19. The turbine blade assembly of claim 17, further comprising:

a second seal tooth extending radially outward from the outer band of the tip shroud, the second seal tooth positioned aft of the first seal tooth in an axial direction.

20. The turbine blade assembly of claim 14, further comprising:

a second compressible element coupled to at least one of the flange or the tip shroud and oriented in the second circumferential direction, wherein the second compressible element is mechanically operable with another adjacent turbine blade assembly to provide a force in the first circumferential direction or the second circumferential direction.

* * * * *